(12) United States Patent
Vestergaard (10) Patent No.: US 7,398,876 B2
(45) Date of Patent: Jul. 15, 2008

(54) CONVEYING DEVICE

(76) Inventor: Martin Vestergaard, Søhøjen 15, Svogerslev, Roskilde (DK) 4000

( * ) Notice: Subject to any disclaimer, the term of this patent is extended or adjusted under 35 U.S.C. 154(b) by 0 days.

(21) Appl. No.: 10/587,910

(22) PCT Filed: Jan. 30, 2004

(86) PCT No.: PCT/DK2004/000065

§ 371 (c)(1), (2), (4) Date: Nov. 30, 2006

(87) PCT Pub. No.: WO2005/073110

PCT Pub. Date: Aug. 11, 2005

(65) Prior Publication Data

US 2007/0158166 A1 Jul. 12, 2007

(51) Int. Cl.
  *B65G 21/14* (2006.01)
(52) U.S. Cl. ................. 198/812; 193/35 F
(58) Field of Classification Search .......... 198/588, 198/587, 594, 812, 831; 193/35 F
See application file for complete search history.

(56) References Cited

U.S. PATENT DOCUMENTS

| | | | |
|---|---|---|---|
| 2,494,302 A | 1/1950 | Mason | |
| 2,859,861 A | 11/1958 | Sheehan | |
| 2,990,938 A | 7/1961 | Sheehan | |
| 3,268,099 A | 8/1966 | Ajero et al. | |
| 3,291,283 A * | 12/1966 | Keith | 193/35 F |
| 3,356,236 A | 12/1967 | Shaw et al. | |
| 4,260,053 A * | 4/1981 | Onodera | 198/812 |
| 4,984,756 A | 1/1991 | Anders | |
| 5,301,790 A | 4/1994 | Prydtz et al. | |
| 5,325,953 A | 7/1994 | Doster et al. | |
| 5,584,376 A * | 12/1996 | Voldby | 198/812 |
| 5,595,283 A * | 1/1997 | Whetsel | 193/35 F |
| 7,156,604 B2 * | 1/2007 | Thogersen | 198/812 |
| 7,261,202 B1 * | 8/2007 | Canapa | 198/812 |

FOREIGN PATENT DOCUMENTS

| | | |
|---|---|---|
| DE | 3703969 | 4/1988 |
| DE | 9014328 | 3/1992 |
| EP | 0767126 | 4/1997 |
| EP | 1248726 | 7/2004 |
| FR | 1564844 | 4/1969 |
| WO | WO 89/02852 | 4/1989 |
| WO | WO 98/54073 | 12/1998 |

* cited by examiner

*Primary Examiner*—James R Bidwell
(74) *Attorney, Agent, or Firm*—James Creighton Wray; Clifford D. Hyra (57) ABSTRACT

A conveying device (1) which is particular in that the conveying device comprises a plurality of conveying elements (2), where each conveying element (2) comprises a chain box element (4) in which at least one transport roller (3) is rotatably fixed such that rollers (3) arranged in adjacent conveying elements (2) define the conveying device transport plane, and that chain box elements (4) of adjacent conveying elements are interconnected in such a way that one conveying element may articulate in relation to adjacent conveying elements, and that at least some of the chain box elements in the conveying device comprise drive elements directly engaging and rotating the transport rollers (3).

16 Claims, 8 Drawing Sheets

CONVEYING DEVICE

This application claims the benefit of PCT/DK2004/000065 filed Jan. 30, 2004 which is hereby incorporated by reference in its entirety.

BACKGROUND OF THE INVENTION

The present invention relates to a conveying device for conveying item, goods, luggage, parcels or the like as well as the use of such a device.

Handling of goods, parcels, luggage and the like can be a very demanding task for a number of reasons, depending especially on the situation at hand. Personnel loading or unloading such items often have to lift them onto a conveyor, or carry the items to the conveyor in order for the conveyor to be able to transport them into or out of storage. In storage facilities, such as warehouses, trucks and containers, although the work may be heavy, the position of the people carrying out the task may be relatively comfortable and, furthermore, wheeled vehicles such as fork lifts and the like may in some instances be used in order to carry and move the items about.

In other instances, especially in cargo holds of trains and in particular in air crafts, the space is extremely limited, whereby the personnel carrying out the transferral of items either from the conveying device into the tightly packaged cargo hold or vice versa often have to be in a rather uncomfortable situation lifting relatively heavy items such as luggage, packages and the like from a kneeling or severely bent-over position. This will eventually lead to injuries and is known to wear cargo personnel down.

In order to alleviate these problems, a number of solutions have been proposed in the prior art. One of these solutions is the well-known flying carpet, which is installed at the bottom of the cargo hold such that, as an item of luggage or package is introduced into the cargo hold, the items are stacked to the appropriate height and the entire stack is slid on the flying carpet into its final position in the cargo hold. As cargo often is stacked in more layers, the personnel will still have to lift the item from the conveyor onto the stack on the flying carpet and push the stack into its final position in the hold. An additional disadvantage with the flying carpet is that, as it is permanently mounted inside the air craft, the extra weight and space taken up by the flying carpet will be a relatively costly installation for the air craft carrier in the long run.

For this purpose, other devices have been developed, such as for example the conveying device disclosed in U.S. Pat. No. 5,584,376. This conveyor is sideways flexible such that it may be placed on the floor of the cargo hold, and by the personnel carrying out the loading or unloading of the cargo hold, the conveyor may be pushed or pulled into an appropriate location in relation to the cargo which needs to be stacked or removed. This device is constructed by having one centrally located single longitudinal rigid, but sideways flexible, plane onto which a number of rails are arranged, said rails having means for rotatably arranging a number of axles onto which transport rollers are provided on which the luggage will be transported.

This conveyor, although providing the advantage that it is removed from the air craft and thereby does not take up space or add extra weight to the air craft, has, however, a number of disadvantages. Firstly, the arrangement of rollers with discrete transport surfaces allows for parts of the luggage such as handles, straps, tags and the like to become stuck. Furthermore, in the crammed space of the cargo hold of an air craft the luggage must still be pushed along the conveyor towards the motorized conveyor of the conventional type which is to be arranged immediately adjacent the gate to the cargo hold.

SUMMARY OF THE INVENTION

The present invention, however, therefore sets out to provide a conveyor system which is very flexible such that it for example may be arranged on top of one or more layers of items, which furthermore comprise compulsion means for rotating the rollers such that the heavy work of pushing a number of items, for example luggage, through the cargo hold is avoided, and at the same time is very flexible and lightweight such that it is easy for the personnel to handle.

This is solved by a conveying device of the type mentioned above which is particular in that the conveying device comprises a plurality of conveying elements, where each conveying element comprises a chain box element in which at least one transport roller is rotatably fixed such that rollers arranged in adjacent conveying elements define the conveying device transport plane, and that chain box elements of adjacent conveying elements are interconnected in such a way that one conveying element may articulate in relation to adjacent conveying elements, and that at least some of the chain box elements in the conveying device comprise drive means directly engaging and rotating the transport rollers.

The provision of articulated joints between adjacent conveying elements provides for a large degree of flexibility in the conveyor such that the conveyor is adaptable to be used in spaces where it hitherto only has been possible to remove cargo and the like by manual means. Furthermore, by providing drive means to at least some of the transport rollers, it is unnecessary for the persons handling the cargo to push the cargo along the conveyor. Furthermore, the drive means may also act in order to control the velocity of the parcels which is an important aspect if the conveying device is elevated for example in connection with being placed on a couple of layers of items or on an inclined surface. This is particularly important where the conveyor also turns sideways in that the aggregated velocity and weight of an item/parcel such as a suitcase may present such a force that, if the speed is too high, it will be pushed off the conveyor due to centrifugal forces in the turn of the conveyor. By keeping the velocity down on the items to be conveyed, it is assured that they will have an increased possibility of staying on to the conveying surface, and thereby correct conveying of items out or into a cargo hold may be achieved.

In a further advantageous embodiment each conveying element is provided with two transport rollers, one on each side of the chain box element, and the axles of the two transport rollers may be separate and independent, or the transport rollers may share a common axle.

In embodiments where the transport rollers only are provided on one side of the chain box element, the conveyor is especially adapted to the bent around the point inside the chain box element's side of the conveyor. By providing transport rollers on each side of the chain box elements it is achieved that the conveying device is more versatile in that it may be bent to both sides regardless of the chain box element.

Furthermore, by providing separate and independent axles for the transport rollers it will be possible to compensate for the different velocities arising from cargo going through a turn in the conveyor. When an item travels along a conveyor in a straight line, its speed in either side of the conveyor will be the same. When the item, however, goes through a turn, the distance which needs to be travelled is longer on the outside than the distance which needs to be travelled on the inside, whereby the transport rollers on the outside should rotate faster than the transport rollers on the inside. This may be achieved by providing the transport rollers on independent axles, whereby the transport rollers are not dependent on the rotational speed of the other transport roller arranged in the same chain box element.

For other purposes, however, it might be advantageous that they share the same axle, namely in cases where drive means are arranged such that gear boxes and the like may be avoided in order for one drive means to power two separate axles and, furthermore, in situations where it is desirable to assure that the same speed is achieved on either transport roller.

In a further advantageous embodiment of the invention each conveying element is provided with a support structure, and said support structure is in one end connected to the chain box element, and is at the opposite end connected to the end of the axle of the transport roller opposite the chain box element, and the support element may optionally be provided with support means, where the means may comprise wheels, studs, gliders, runners or the like.

In order to provide added stability such that the conveying device does not rest solely on the chain box element, a support structure is provided. This support structure also supports the transport rollers such that the stresses transferred to the bearing in the chain box may be lessened. The overall structure thereby becomes more rigid and may be exposed to a harsher treatment. In order to further facilitate the versatility and user-friendliness of the device, the support structure may be provided with support means such that the positioning of the conveying device is eased. Especially repositioning or placing the device in a new position while the conveying device is loaded with for example luggage in the cargo hold of an airplane may be facilitated in this manner.

In a further advantageous embodiment the articulation joint connecting two adjacent conveying elements comprises a ball structure attached or integral with the chain box element at one end of the conveying element, and gripping means in the shape of two ring members at the opposite end of the chain box element, said ring members arranged such that the ball structure of an adjacent conveying element may be held between the two ring members. In addition to being relatively easy to manufacture, this type of connection provides for a very stable and yet flexible connection between two conveying elements. It thereby becomes possible to provide a very strong, simple and yet versatile joint.

In a still further advantageous embodiment, relative articulation movements between two adjacent conveying elements is divided between two joints in each conveying elements such that articulation in the transport plane and twisting between two adjacent conveying elements is provided by a first joint comprising the cooperation of the ball structures with the two ring members provided on an adjacent conveying elements, and that a second joint is provided in the chain box element for relative inclination, respectively declination, in relation to the intended transport direction.

By further separating the articulation into two distinct movements where each movement is undertaken by a separate joint it becomes possible to flex the conveying device to a greater extent that what is possible with the articulation joint described above. By allowing the sideways flexing and twisting of two adjacent conveying elements in the ball and ring connection, this connection can be further reinforced in that the ball/ring joint does not need to be able to provide for the conveying device to adapt to inclinations or declinations. The flexing movement of the conveying device may, therefore, be better controlled. Twisting, i.e. the angular variation between two adjacent conveying elements, may also be provided and guided by means incorporated, for example in the ball and ring members. In some instances it might be advantageous to be able to twist the conveying device, for example in order to compensate for turns where items conveyed on the conveying device have to maintain a certain velocity. This principle is also known from race tracks, bicycle domes and the like where the track is elevated on the outside in order to compensate for centrifugal forces influencing the vehicles on the track. Furthermore, the twisting abilities of the conveying device also allows for unevenness which may be present on the surface onto which the conveying device is placed.

The inclination, respectively declination, of the conveying device, i.e. whether items are to be transported up or down, is provided by an articulation joint separate from the ball/ring joint. The joint may be in the shape of overlapping circular half sections, for example where the drive axles of the transport rollers are fastened to a chain box such that the chain box element may bend in a plane substantially perpendicular to the transport plane. These aspects will be further explained in the detailed description of a preferred embodiment below.

In a further advantageous embodiment the chain box element is hollow or at least an open passage is provided through the chain box element in the intended transport direction such that a through going passage is provided substantially through the entire conveying device allowing for wires, pipes and/or power cables to pass through the conveying element.

The hollow construction makes it possible to arrange all drive means and support elements for the drive means inside the chain box element, whereby these installations may be completely integrated in the conveying device. By shielding these installations from the outside, the risk of damage to the installations and thereby accidental destruction of the drive means is effectively hindered. Furthermore, cables, wire and the like may be become hitched on objects during the placing and arranging of the conveyer device inside the cargo hold such that the personnel handling the conveying device may have to exert an exaggerated force if not noticing that cables, wires or other power lines have become stuck, whereby an increased risk of damaging the power functioning of the conveying device is aggravated.

In a further advantageous embodiment drive means are provided in all chain box elements, whereby all transport rollers are powered.

Although the size of parcels and luggage may be of such a nature that it will span over more transport rollers, and arranging drive means in only every third, fourth or whatever transport roller may thereby be sufficient in order to propel the item along the conveying device, it might in some instances be advantageous to provide each and every chain box element with drive means such that all transport rollers may be propelled. This is particularly true in places where the items to be conveyed may have varying size such that a steady flow of items to be conveyed may be achieved regardless of size.

In instances where not all transport rollers are provided with drive means and the items to be conveyed have different sizes, the items may stock up such that the items will push each other along the conveyor. This may damage some of the items or may push some items off the transport conveyer in cases where the items have not been placed exactly or correctly on the conveying surface. These situations can, to a large degree, be avoided by providing each transport roller with its own independent drive means, whereby the distance which is originally provided between each item during the loading or unloading procedure will be maintained throughout the conveying procedure.

In a further advantageous embodiment the suitable drive means is chosen among electric motors, hydraulic motors, belt drives coupled to a motor which belt drive powers two or three adjacent boxes, gearwheels, one or more chains.

When selecting the appropriate drive means which is suitable, the choice depends on the circumstances under which the conveying device is to be used. For some applications, and especially for loading and unloading of a cargo base on air crafts, it is desirable to provide an overall construction which is low and lightweight. In these instances it might be advantageous to choose a solution where electric motors are used as drive means. Electric motors have the advantage that they are rather compact constructions compared to the possible power output and that power may be provided to the motor by wiring, which is flexible, cheap and easy to install. Especially in the embodiments of the invention where the chain box elements are hollow, the wiring as well as the electric motors may be arranged inside the cavities provided in the chain box elements.

However, hydraulic motors may also be used, where the hydraulic pump may be placed outside the conveying device and by appropriate hydraulic power lines hydraulic fluid under pressure may be forwarded to hydraulic motors arranged on the axles of the transport rollers for rotating these axles.

A further interesting means for powering the transport rollers is the provision of a motor which is coupled to a belt drive mechanism such that a double belt wheel is provided on each axle of the transport rollers. By rotating the belt by means of a motor the rotation of the transport rollers' axle will be forwarded to the adjacent axle by means of a belt arranged in the second belt wheel. In this manner it is possible to provide rotational power to a number of transport rollers deriving from one single motor means. By appropriately arranging the axles of the transport rollers and thereby the double belt wheels in relation to the articulation points in the conveying device, a large degree of flexibility will be maintained in the conveying device as such.

A similar advantage may be achieved by replacing the belts with chains or in an altogether alternative embodiment where a series of gear wheels arranged inside the hollow chain box element transfers the power from the motor means to the axles of the transport rollers.

In a further especially preferred embodiment the transport rollers are configured as non-cylindrical rollers, conical rollers or curved rollers, and all the rollers may be identical or any combination of different shapes of rollers may be combined in the same conveying device.

For some purposes it has been found advantageous to not use cylindrical rollers. Especially in instances where the items to be transported have substantially flat surfaces, it has been found that using transport rollers having a cylindrical shape could push the items to be transported slightly off track, especially when the path of the conveying device comprises sterns. By, however, giving the transport rollers a conical shape such that the diameter of the roller is larger on the outside of the conveying device and diminishing toward the centre, a centring effect of the items arranged on the transport surface of the conveying device was achieved. As items are transported along the conveying device they will experience a certain limited shaking or bouncing. Due to the influence of gravity, this in combination with for example conical rollers will cause the items to move towards the centreline of the conveying device. The conical features of the transport rollers will, during straight runs of the conveying device, try to centre the items in relation to the centre axis of the conveying device due to the conical characteristics of the transport rollers. When an item is transported through a turn in the conveying device, the conical shape will likewise try to maintain the items to be transported as close to the centre line of the device as possible. If the transport rollers are cylindrical, this centring effect due to the conical, i.e. inclined surface, will not be effected and the items to be transported will as a result be brought into a position closer to the outer side of the turn on the conveying device. This outer position may be so exaggerated that the item may fall off the conveying device altogether. For special items, other roller shapes might be found advantageous; for example, curved rollers having their minimum diameter close to the central line were found to be advantageous when conveying smaller items or items not having substantial flat surfaces. In some instances it might also be advantageous to combine different types of transport rollers, i.e. transport rollers in one section being absolutely cylindrical, whereas the cross-sections in other parts of the conveying device advantageous may be in the shape of conical transport rollers. The skilled person having recognized the advantages of using curved, conical or cylindrical transport rollers will thereby be able to design a conveying device providing for optimum transport conditions.

In a further advantageous embodiment the conveying device or particular elements thereof may be manufactured from one or more of the following material groups: plastics, reinforced plastics, aluminium, steel, stainless steel, ceramics, brass, rubber, latex, nylon and resin based composites.

In the air craft industry it is well-known to use aluminium, hydraulic piping, electrical motors and wiring, whereby the advantages of these materials may be utilized in the conveying device according to the invention for applications especially connected to loading and unloading of luggage. Aluminium has proven to be a very durable material, which also is lightweight. Furthermore, aluminium may be cast which is an advantageous process in connection with manufacturing the chain box elements. Furthermore, aluminium is weldable whereby repairs may be carried out on sight and within the technical knowledge of personnel working and maintaining air crafts in general. For other purposes it might be advantageous to manufacture parts of the conveying device in reinforced plastics or plastics in that these materials are rather cheap and especially with respect to reinforced plastics exhibit very good durability and strength characteristics. For yet other applications it might be advantageous to manufacture the conveying device mainly from steel and in the food processing industry, where a conveying device according to the invention may be implemented in a slaughterhouse, fish working industry or the like, the device may advantageously be manufactured from stainless steel which is hygienically acceptable, easy to clean and does not grown old.

The rollers may, again according to circumstances, be manufactured from any suitable material, but especially for conveying luggage, parcels and the like, transport rollers having a surface with high friction characteristics is advantageous, in which case the outer surface of the transport rollers may be clad in rubber, latex, nylon or other resin-based composites, whereby the skilled person may design the surface of the transport roller as a compromise between friction characteristics and durability.

In a still further advantageous embodiment of the invention the outer carrying surface of the transport rollers is continuous or discontinuous for example by the provision of ring sections separated by valleys, and in the discontinuous configuration ring sections in transport rollers in one conveying element are offset in relation to ring sections in transport rollers in adjacent conveying elements.

A number of advantages are achieved by this configuration of the transport rollers. Firstly, when the conveying device needs to follow a turn, ring sections arranged off-set on adjacent transport rollers may overlap the rotation of the transport rollers without hindering, whereby a tighter turn of the conveying device may be achieved than what would be possible if the rollers had been solid. Furthermore, the weight of the device as such is lowered, whereby the handling by personnel becomes easier. Also, the power needed for rotating and especially accelerating the rollers when not loaded is less due to the reduced weight.

The present invention also relates to use of a conveying device as disclosed above for handling goods, luggage, parcels and the like in air planes, cargo bases, trains, ships, trucks or other vehicles, storage facilities, warehouses, auction lines and the like.

The invention will now be described in detail with reference to the accompanying drawing, wherein

DETAILED DESCRIPTION OF THE PREFERRED EMBODIMENTS

Figure 1:
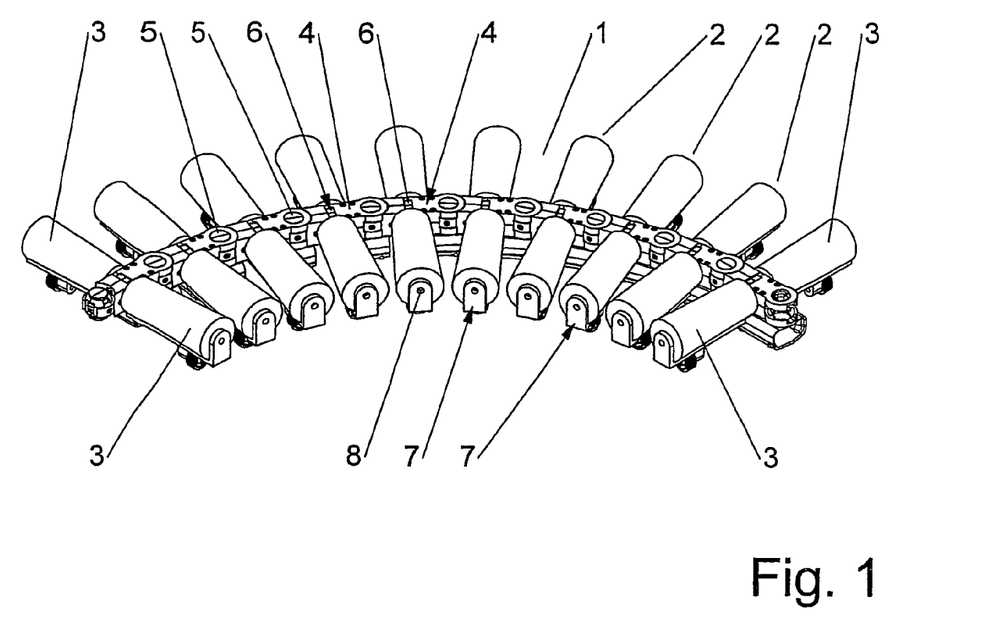
FIG. 1 illustrates a preferred embodiment of a conveying device.
Figure 2:
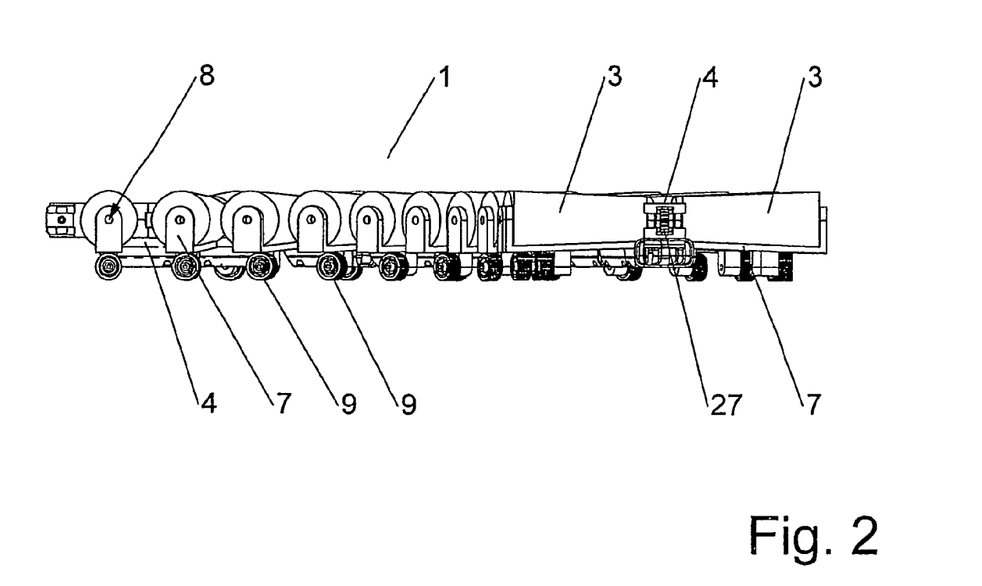
FIG. 2 illustrates the preferred embodiment of FIG. 1 from another angle.

In FIGS. 1 and 2 is illustrated an embodiment of the invention wherein a conveying device 1 comprises a number of conveying elements 2.

Each conveying element 2 comprises two transport rollers 3 and a chain box element 4. The conveying elements 2 are assembled in articulate manner to a neighbouring conveying element by the articulate joint 5, which will be further described with reference to FIG. 6.

Each chain box element further comprises a hinge mechanism 6 which makes it possible to incline, respectively decline, the gradient of the conveying device.

The conveying device is furthermore supplied with support structures 7. The support structure serves to relieve the chain box element of some of the stresses and loads arising when items are conveyed on the transport rollers in that the transport rollers are, in addition to being supported in the chain box element, also supported by a bearing structure 8 provided in the support structure 7.

In this particular embodiment the support structure is also provided with support means in the shape of wheels such that the entire load from the conveying device and items carried on the conveying device is not supported solely on the chains box elements 4, but may also be supported by the support structure via the wheels 9. The wheels 9 may, as illustrated with reference to FIG. 2, be arranged such in connection with the support structure 7 that the chain box element 4 is elevated from the carrying surface such that the entire load from the conveying device and items carried on the transport rollers are supported solely on the wheels 9.

Figure 3:
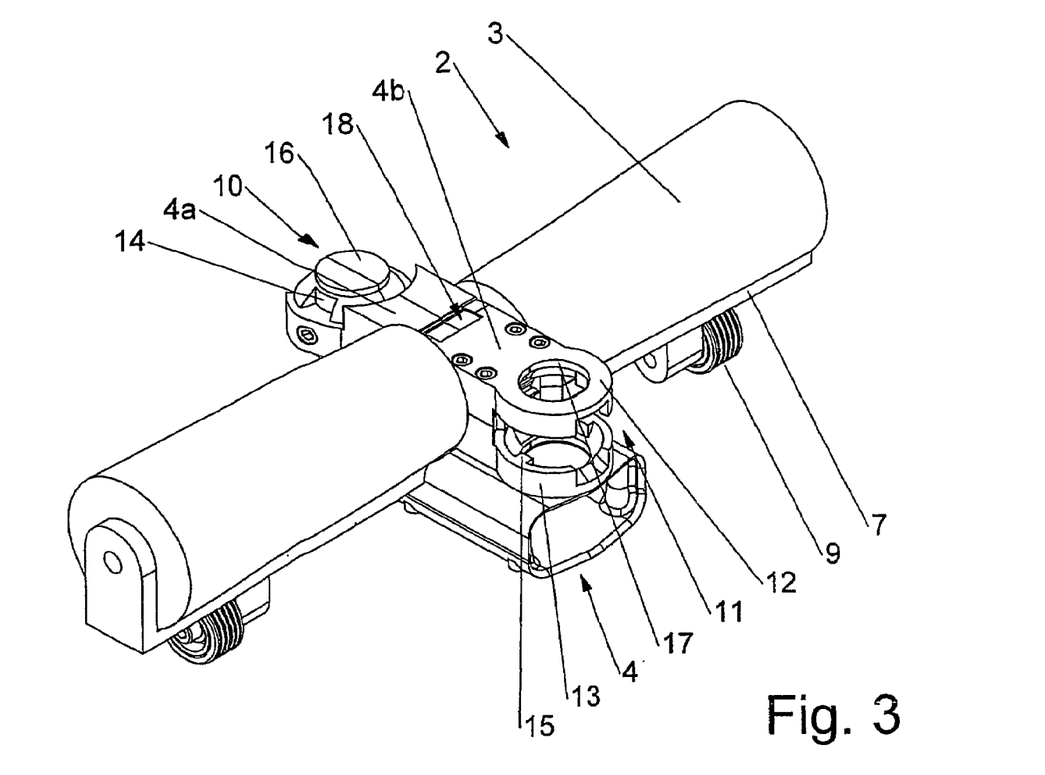
FIG. 3 illustrates a detailed section of a conveying element.

In FIG. 3 is illustrated one single conveying element 2 according to the invention.

The connection between two adjacent conveying elements 2 as illustrated in FIG. 1 may be achieved by the articulate joint which will be explained with reference to FIG. 3. Each conveying element 2 comprises a ball structure 10 at one end. At the opposite end gripping means 11 are provided. The gripping means 11 are shaped as two ring members 12, 13 such that the ball structure 10 will be accommodated between the two ring members 12,13. In this manner one conveying element 2 may be flexed in a plane parallel to the transport plane defined by the top surface of the transport rollers 3 in that the two ring elements 12, 13 do not hamper the rotation of the ball structure 10.

In this embodiment means has been provided in order to limit the amount of relative rotation between two adjacent conveying elements. This limitation is necessary in order to avoid that transport rollers 3 of two adjacent conveying elements 2 come into contact and thereby, due to the friction, hinder rotation of the transport rollers 3 and thus the ability of the conveying device to convey items along the transport surface.

The means comprises co-operating parts, the ball structure and the ring members. In the ball structure a cut-out section 14 is provided on both sides of the ball structure. Corresponding to the cut-out section 14 on the ball structure, the ring members are provided with notches 15 such that the notches are smaller than the cut-out sections 14, whereby the ball section may rotate in relation to the ring members until they come into contact with the notches 15. By dimensioning cut-out sections 14 and the notches 15, the amount of flexing allowed by the single conveying elements in relation to a neighbouring conveying element may be designed according to circumstances.

Figure 4:
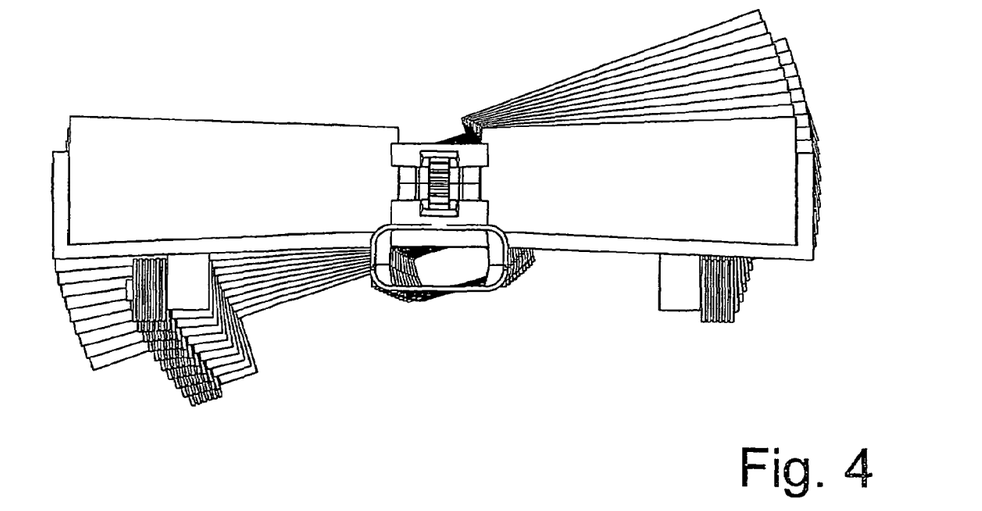
FIG. 4 illustrates the twisting ability of the conveying device.

In order to allow the transport surface of the conveying device 1 to twist, the ball structure is further provided with a limiting flexing member 16 provided in its upper part and lower part (not shown). In the ring members corresponding cut-out sections 17 are provided. In order to allow for relative movement between the section 16 and the cut-out section 17, the diameter of the cut-out section 17 is larger than the limiting section 16 on the ball structure 10. Again, by designing the difference in size the amount of twist allowed in the conveying device may be pre-designed. In FIG. 4 is illustrated a view of a conveying device which is twisting by the articulate connection as described above.

The mechanism for allowing twisting may also allow the transport surface to be inclined or declined, i.e. it allows for the conveying device to provide for an upward or downward going slope although it may be limited. In order to improve this feature, a hinge-like construction 18 is provided in the chain box element 4. The construction and functioning of this hinge-like construction 18 will be explained in further detail with reference to FIGS. 5 and 6. In the embodiment of the invention where a hinge is provided, the cut-out section 17 may be oval, having its longer dimension perpendicular to the centre line of the conveying device. Hereby it is achieved that relative twisting between adjacent elements is facilitated, and a very steady and firm connection is provided. The hinge provides only for inclination or declination of two adjacent elements and therefore has no detrimental effect on the stability of the entire conveying device.

Figure 5:
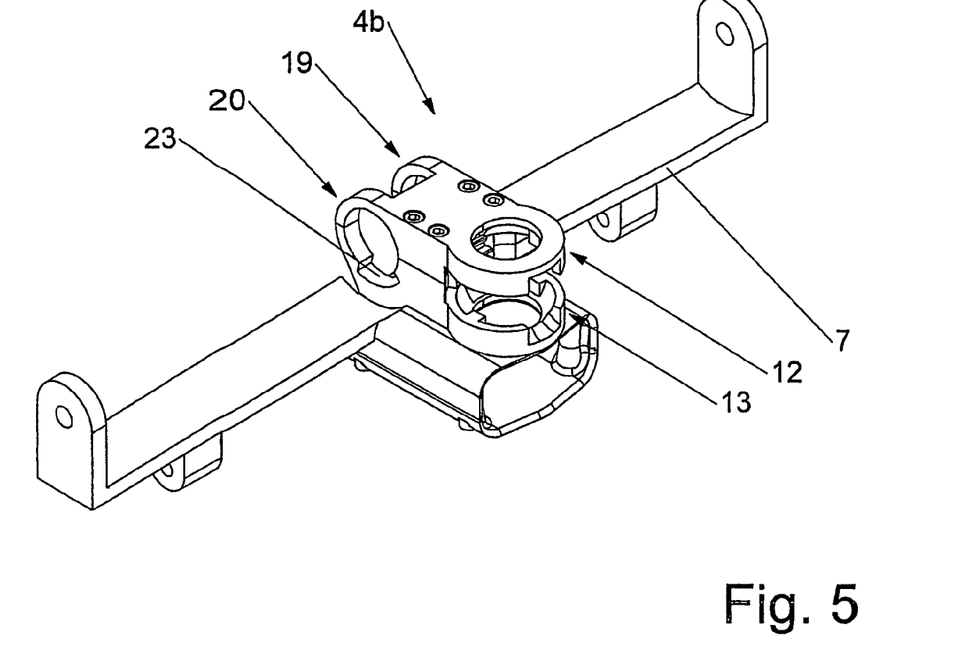
FIG. 5 illustrates details of a conveying element without rollers.
Figure 6:
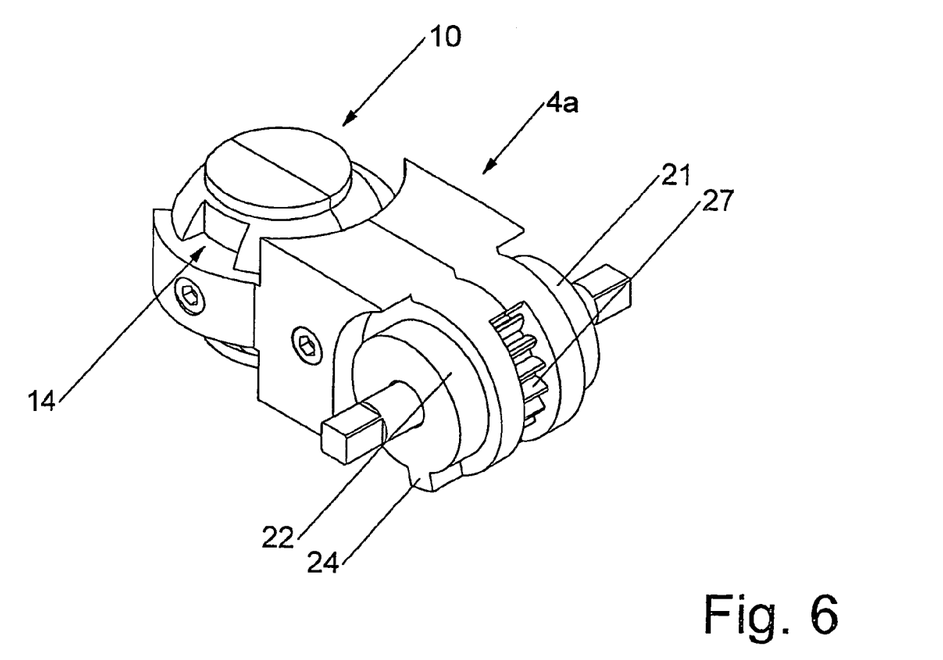
FIG. 6 illustrates details relating to the hinge and articulation joints.

In FIGS. 5 and 6 the transport rollers as well as the wheels are not illustrated. The chain box elements comprise two sections 4a and 4b, which together form the hinge. In the part 4b, two ring sections are provided 19, 20. The inner diameters of these two ring sections 19, 20 is slightly larger than the outer diameter of corresponding circular protrusion 21, 22 provided on the chain box element 4a (see FIG. 6).

In principle, the relative rotation between the two parts 4a and 4b could be unlimited, but in order to limit the relative rotation and thereby minimize the risk of breakage and unintended use or positioning, a limiting mechanism has been incorporated as illustrated in FIGS. 5 and 6. This limiting construction is in principle equivalent to the turning principle incorporated between the ball structure and the gripping means relating to the turning and twisting possibilities of two adjacent conveying elements. On the chain box element part 4b is provided a recess 23 and, corresponding to the recess, a notch element 24 is provided on the ring element 22. When the parts 4a, 4b are assembled, the notch 24 will fit inside the recess 23 such that the relative rotation between the two parts 4a and 4b is limited through the travel of the notch inside the recess 23.

Figure 7:
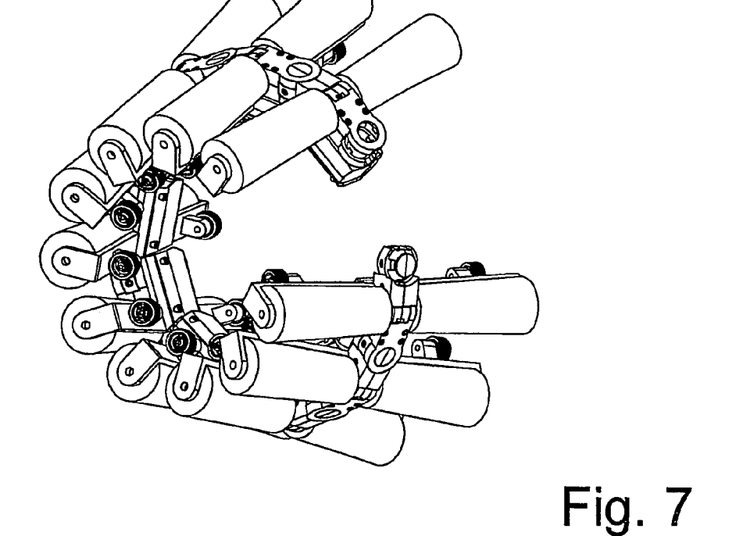
FIG. 7 illustrates the flexing abilities of the conveying device.

By combining the articulation possibilities as described above with reference to FIG. 3, 4, 5, 6, the entire conveying device is able to follow a path as illustrated in FIG. 7. Although this part would never be useful or desirable in reality, the object of the figure is to illustrate that the conveying device according to the invention has a large degree of freedom, whereby the use of such a device having these inventive constructions and principles provides for the possibility of using such a device in a multitude of applications.

Figure 8:
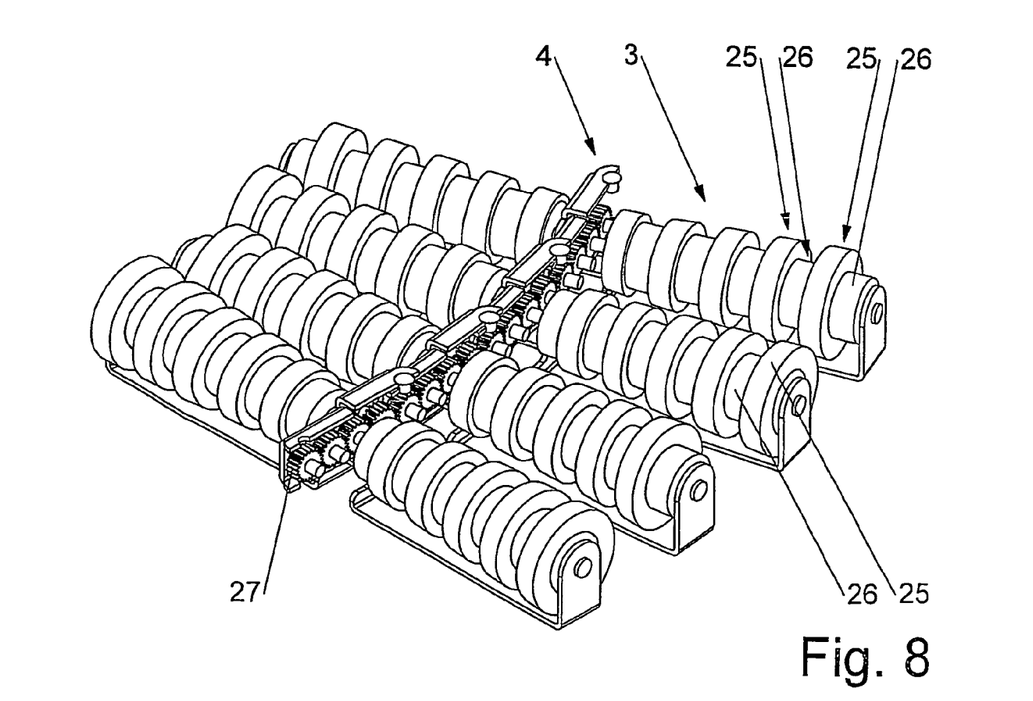
FIG. 8 illustrates a different embodiment with a cut-away section of the chain box element.
Figure 9:
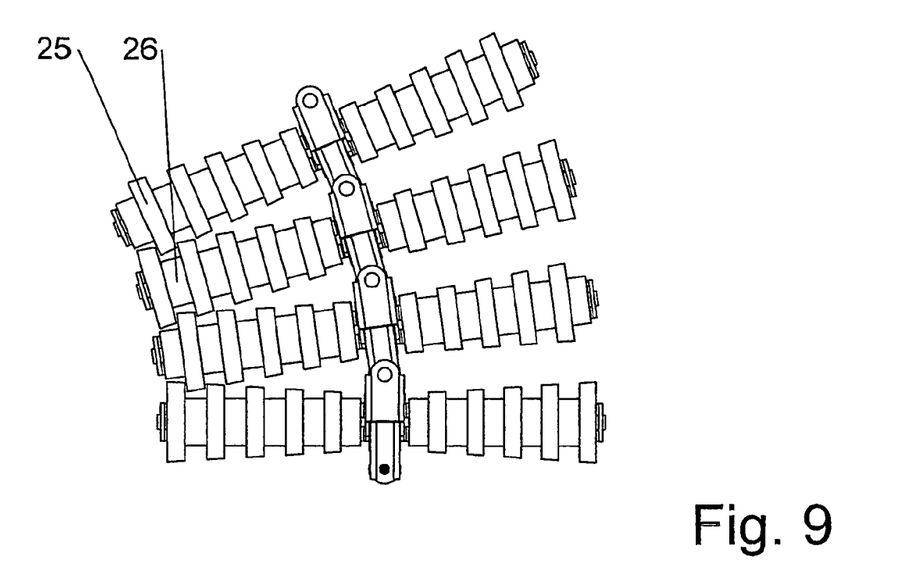
FIG. 9 illustrates a plane view of FIG. 8.

In FIGS. 8 and 9, an alternative embodiment of a conveying device according to the invention is illustrated. The transport rollers 3 are in this embodiment shaped such that ring elements 25 alternate with valleys 26 along the extension of the transport rollers. In the illustrated embodiment the rings 25 have varying and decreasing diameters the closer to the chain box element they are positioned. In this manner, a conical transport roller 3 is achieved comprising only a limited amount of roller surface contacting the goods to be transported on the conveying device. Obviously, the rings 25 and valleys 26 may be given any desirable relative sizes and/or the rings may have equal diameters as a matter of choice for the skilled person. By further configuring the transport rollers such that on a first roller a valley 26 is provided outermost followed by a ring 25 followed by a valley 26, etc. On the adjacent roller a ring 25 is arranged outermost followed by a valley 26 followed by a ring 25, etc. As the conveying device is bent, as illustrated with reference to FIG. 9, the ring 25 will fit inside the valley 26 provided in the adjacent conveying element.

Figure 10:
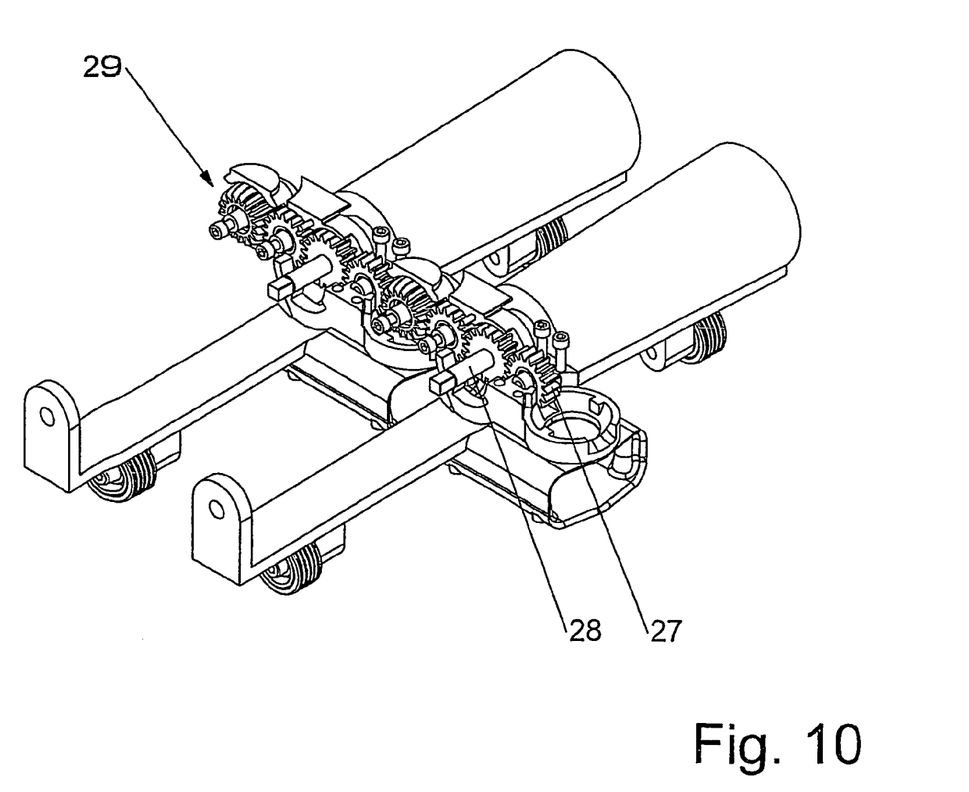
FIG. 10 illustrates a different embodiment with a cut-away section of the chain box element.

In FIGS. 3, 4, 5, 6 and particularly in FIG. 8, the drive means provided in order to rotate the transport rollers is illustrated as a series of gear wheels 27. With special reference to FIG. 10 the transport rollers and part of the chain box element have been cut away in order to expose the gear wheels 27 and the axles 28 of the transport rollers. In order to allow for the twisting and turning movement of the conveying device, special gear wheels 29 having a ball-like shape are provided internally in the ball structures 10. The axles 28 may either be independent, i.e. the gear wheels are arranged around the axles 28 may in fact be a doubled wheel construction such that it is possible to allow one axle to rotate faster than the other. Also, the interface between the gear wheel and the axle may be of the type where the axle can freely rotate in one direction and can be propelled in the opposite direction.

Figure 11:
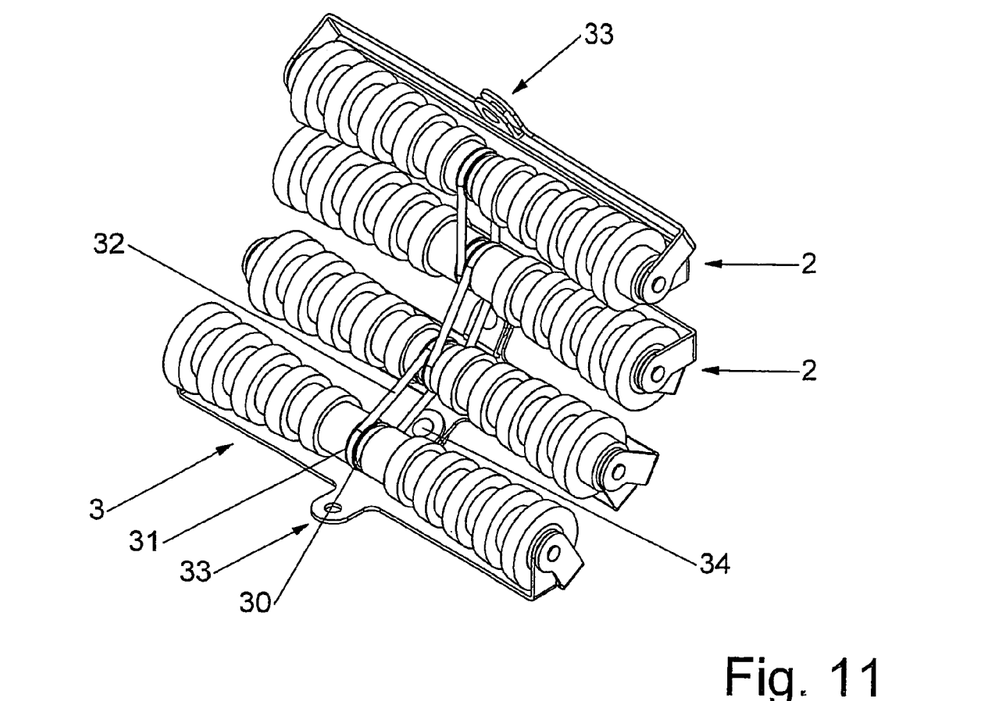
FIG. 11 illustrates an embodiment with belt drive.

In FIG. 11 an embodiment of the invention is illustrated where the rotation of the transport rollers 3 is facilitated by the provision of belt drives. The transport rollers 3 may in place of the chain box element be provided with two belt wheels 30, 31 arranged side by side on the axle of the transport roller 3. A belt 32 is arranged between adjacent belt wheels such that the propulsion is transferred via the belt from one transport roller to the adjacent transport roller.

In this embodiment the chain box element may be avoided and the connection between two adjacent conveying elements 2 may be in the shape of a simple wire connection 32 and an assembly bolt 34 or the like.

Figure 12:
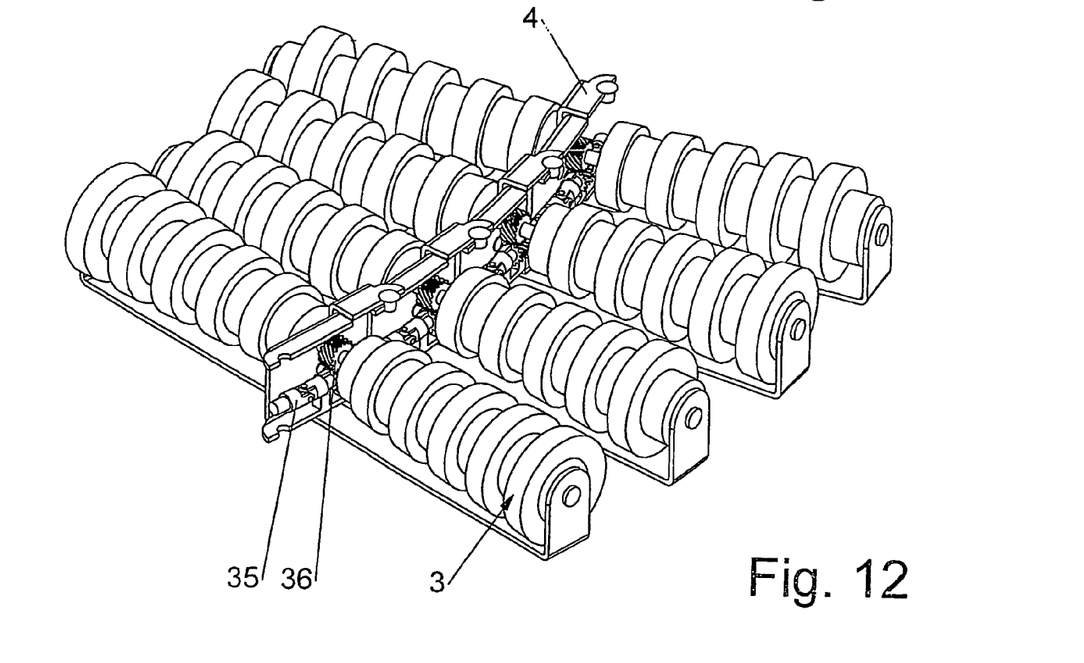
FIG. 12 illustrates an embodiment with cardan and worm gear.

In FIG. 12 is illustrated an embodiment of the invention where the drive means is in the shape of a cardan drive or universal drive which may be arranged inside the chain box member. In order to illustrate the arrangement of the drive means, a portion of the chain box element has been cut away for illustration purposes. The cardan drive 35 will by means of a worm drive 36 effect the rotation of the transport rollers 3 in order to achieve the inventive advantages of the present invention.

Figure 13:
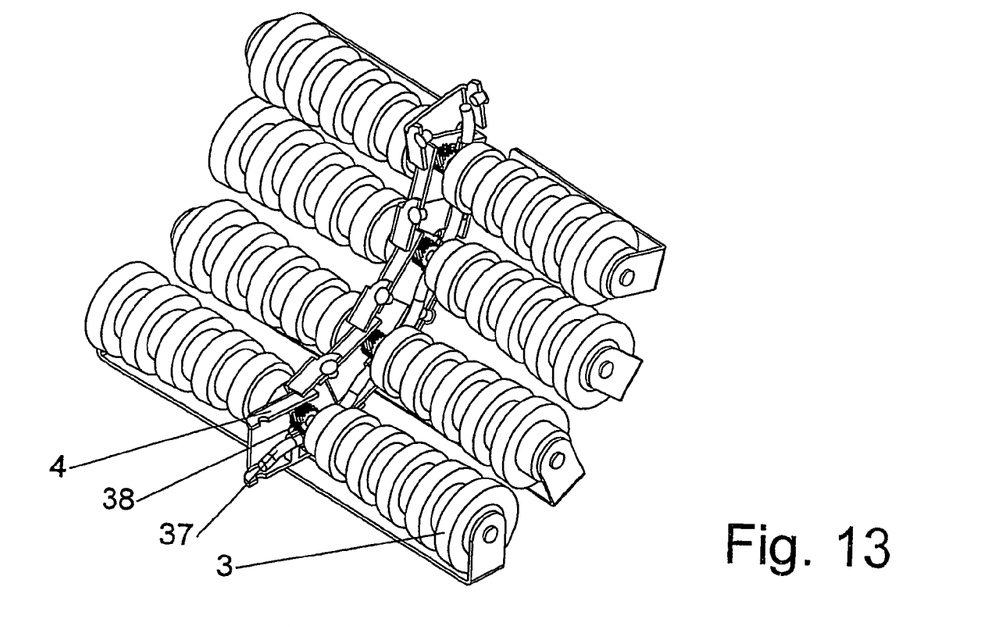
FIG. 13 illustrates an embodiment with a torque resistant member and worm gear.

Turning to FIG. 13 the cardan drive has been replaced by a torsion-stiff, flexible member, i.e. a member which, when exposed to a turning movement, will transfer this movement throughout the length of the cable, but will be flexible when bent. The torsion cable 37 transfers the rotation via the worm drive 38 to the transport rollers 3. As was the case with the embodiment of the invention illustrated in FIG. 12, part of the chain box element has been cut away for illustration purposes.

Figure 14:
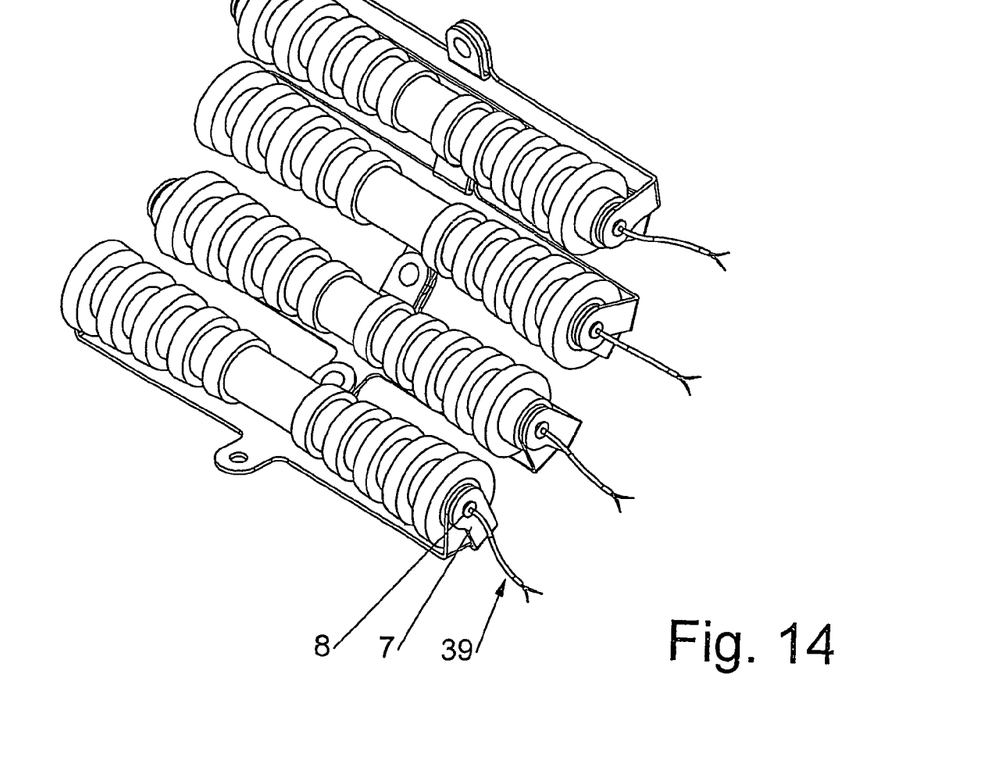
FIG. 14 illustrates an embodiment with electrical motor means inside the rollers.

In FIG. 14 an embodiment is illustrated where inside each transport roller an electrical drive means is provided. The electrical caballing 39 is arranged such that it extends outside the transport roller through the bearing arrangement 8 fixed in the support structure 7.

When loading or unloading luggage in the airports from an aircraft, the luggage is transported from the loading opening in the aircraft to the luggage trailer placed on the ground by means of a transport conveying device. This transport conveying device is usually a small truck on which a conveying belt is built on top of the truck such that the top of the conveying belt has a more or less horizontal section which may be vertically adjusted such that the top plane of the conveyor may be brought to an equal level as the floor in the loading bay of the aircraft. In this manner, it is relatively easy to move the luggage out of the hold of the aircraft onto the conveyor belt and thereby convey it to the trolley placed on the ground. The trolley will, thereafter, take the off-loaded luggage to the luggage/baggage conveyor from which the passengers can reclaim their luggage.

Figure 15:
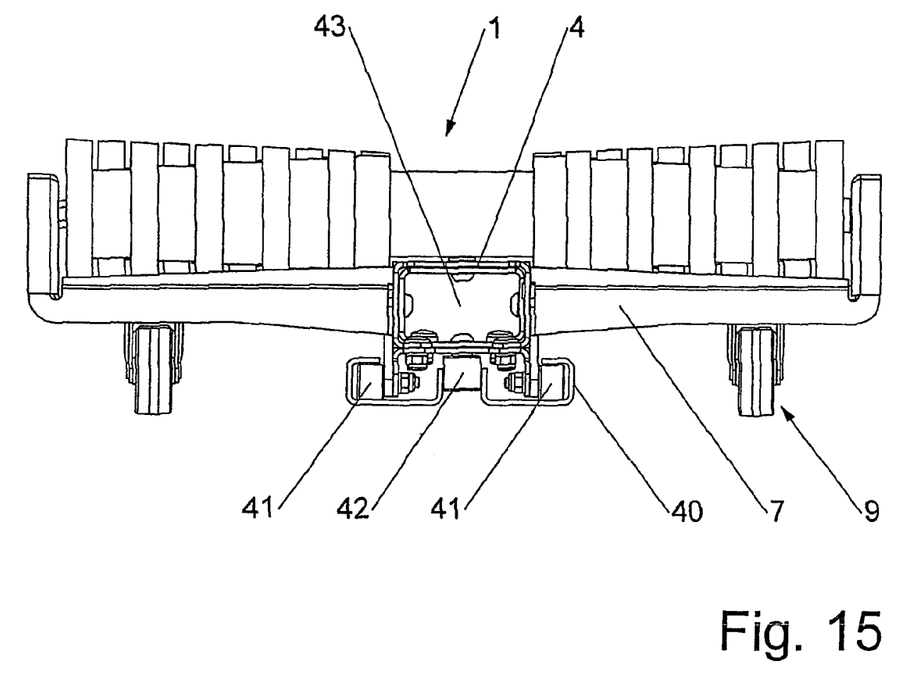
FIG. 15 illustrates an embodiment where the conveying device is arranged in a guide rail.

With the present invention, however, as illustrated in FIG. 15, it is possible to arrange the conveying device according to the present invention underneath the conveying device for transporting the luggage from the cargo hold to the luggage trolley placed on the ground. This is done by arranging a box-like structure underneath the conveyor such that the conveying device according to the invention can slide out of and into this box-like structure. For this purpose, a guide rail 40 is arranged inside the box such that the chain box elements 4 of the conveying device according to the invention may by means of guidance rollers 41, 42 roll inside the guide rail 40 such that it is relatively easy to eject or insert the conveying device into the conveyor. As the conveying device 1 is pushed out of the box-like structure underneath the conveyor by guiding the guide rollers 41, 42 along the guide rail 40, the rollers 9 arranged on the support structure 7 will roll on the floor of the cargo hold and as explained above, it will be possible for the personnel working in the cargo bay to manually manipulate the conveying device 1 into a proper position.

The advantage of the embodiment illustrated in FIG. 15 may especially be seen in the provision of the central guidance roller 42. The central roller will adjust and guide the guidance rollers inside the guide rail 40 such that even if the very flexible roller should have a tendency to become stuck in the guide rail 40, the guide roller 42 will make sure that this does not happen in that the chain box 4 will be centralized in relation to the guide rail 40 such that the guidance rollers 41 always will be able to roll freely. The guidance roller 42 has a diameter which is slightly smaller than the distance between the two sections of the guide rail 40 such that it will be able to roll freely either on the right hand side or left hand side portion of the guide rail 40. It should also be noted that the guide rail 40 is mounted on a structure (not illustrated) such that the guide rail 40 is fixed in relation to the movable conveying device 1 according to the invention in order to allow the conveying device 1 to be extracted or inserted in the guide rail 40 depending on circumstances.

Although the conveying device 1 in this embodiment has been equipped with guidance rollers 41 for interaction with the guide rail 40 arranged in the conveyor which is traditionally used in the airports for moving luggage into or out of hold of airplanes, it should be noted that other means for guiding the conveying device according to the invention into or out from the position in the conveyor may be used. For example, instead of the guidance rollers 41 and the guide rail 40, the wheels already equipped on the support structure 7 may be arranged in suitable rails in the conveyor for guiding the conveying device 1 into or out of the hold of the aircraft.

One important aspect of the conveying device according to the invention is the provision of the chain box 4. The chain box is hollow as indicated in FIG. 15 by reference number 43. Within the hollow space of the chain box which is through going such that one long cavity is formed between adjacent chain boxes in a conveying device, the different means for powering the rollers, wires etc. may be placed in this through going cavity. The installations are in this way shielded from the surrounding environment and protected by the chain box 4. Access may be gained to the chain box for example by removing a lid which may advantageously be placed in the bottom part of the chain box such that access may be gained to the installations inside the hollow space 43.

Another important aspect is that should one or more of the independent conveying elements fail, for example, due to excessive wear on the rollers, defaults in the motor, or general breakage, it is possible without completely disassembling the entire conveying device to replace one conveying element simply by removing the lid and thereby gaining access to the hollow space 43 and attaching the motor means after which the conveying element may be removed and a new probably functioning conveying element may be installed in its place.

Although various specific embodiments of the invention have been explained above, it is within the scope of the present invention that features from one specific embodiment may be combined with features from a different specific embodiment. Likewise, other means for driving the transport rollers which may be adapted to one or more of the constructions described above or which are adaptable such as for example a hydraulic drive are contemplated within the present invention.

The invention claimed is:

1. Conveying device wherein the conveying device comprises a plurality of conveying elements, where each conveying element comprises a chain box element in which at least one transport roller is rotatably fixed such that rollers arranged in adjacent conveying elements define the conveying device transport plane, and that chain box elements of adjacent conveying elements are interconnected in such a way that one conveying element may articulate in relation to adjacent conveying elements, and that at least some of the chain box elements in the conveying device comprise drive means directly engaging and rotating the transport rollers, wherein the chain box element is hollow or at least an open passage is provided through the chain box element in the intended transport direction such that a through going passage is provided through substantially the entire conveying device allowing for wires, pipes and/or power cables to pass through the conveying element.

2. Conveying device according to claim 1 wherein each conveying element is provided with two transport rollers, one on each side of the chain box element, and that the axles of the two transport rollers may be separate and independent or the transport rollers may share a common axle.

3. Conveying device according to claim 1 wherein each conveying element is provided with a support structure, and that said support structure is connected to the chain box element at one end and at the opposite end is connected to the end of the axle of the transport roller opposite the chain box element, and that the support element optionally may be provided with support means.

4. Conveying device according to claim 1 wherein the articulation joint connecting two adjacent conveying elements comprises a ball structure attached or integral with the chain box element at one end of the conveying element and gripping means in the shape of two ring members at the opposite end of the chain box element, said ring members arranged such that the ball structure of an adjacent conveying element may be held between the two ring members.

5. Conveying device according to claim 4 wherein the relative articulation movement between two adjacent conveying elements is divided between two joints in each conveying elements, such that articulation in the transport plane and twisting between two adjacent conveying elements is provided by a first joint comprising the ball structures cooperation with the two ring members provided on an adjacent conveying elements, and that a second joint is provided in the chain box element for relative inclination, respectively declination, in relation to the intended transport direction.

6. Conveying device according to claim 1 wherein drive means are provided in all chain box elements, whereby all transport rollers are powered.

7. Conveying device according to claim 1 wherein the drive means is chosen among electric motors, hydraulic motors, belt drives coupled to a motor which belt drive powers two or three adjacent boxes, gearwheels, one or more chains.

8. Conveying device according to claim 1 wherein the transport rollers are configured as non-cylindrical rollers, conical rollers, or curved rollers, and that all the rollers may be identical or any combination of different shapes of rollers may be combined in the same conveying device.

9. Conveying device according to claim 1 wherein the conveying device or particular elements thereof may be manufactured from one or more of the following material groups: plastics, reinforced plastics, aluminium, steel, stainless steel, ceramics, brass, rubber, latex, nylon, resin based composites.

10. Conveying device according to claim 1 wherein the outer carrying surface of the transport rollers is continuous or discontinuous for example by the provision of ring sections separated by valleys, and that in the discontinuous configuration ring sections in transport rollers in one conveying element are off-set in relation to ring sections in transport rollers in adjacent conveying elements.

11. Use of conveying device according to claim 1 for handling items in locations.

12. Conveying device according to claim 3, wherein the support means comprise wheels, studs, gliders, or runners.

13. Use according to claim 11, wherein the items comprise goods, luggage, or parcels.

14. Use according to claim 11, wherein the locations comprise airplanes cargo bays, trains, ships. trucks or other vehicles, storage facilities, warehouses, or production lines.

15. Conveying device wherein the conveying device comprises a plurality of conveying elements, where each conveying element comprises a chain box element in which at least one transport roller is rotatably fixed such that rollers arranged in adjacent conveying elements define the conveying device transport plane, and that chain box elements of adjacent conveying elements are interconnected in such a way that one conveying element may articulate in relation to adjacent conveying elements, and that at least some of the chain box elements in the conveying device comprise drive means directly engaging and rotating the transport rollers, wherein the articulation joint connecting two adjacent conveying elements comprises a ball structure attached or integral with the chain box element at one end of the conveying element and gripping means in the shape of two ring members at the opposite end of the chain box element, said ring members arranged such that the ball structure of an adjacent conveying element may be held between the two ring members.

16. Conveying device according to claim 15 wherein the relative articulation movement between two adjacent conveying elements is divided between two joints in each conveying elements, such that articulation in the transport plane and twisting between two adjacent conveying elements is provided by a first joint comprising the ball structures cooperation with the two ring members provided on an adjacent conveying elements, and that a second joint is provided in the chain box element for relative inclination, respectively declination, in relation to the intended transport direction.

* * * * *